(12) United States Patent
Palan et al.

(10) Patent No.: US 10,547,464 B2
(45) Date of Patent: Jan. 28, 2020

(54) AUTONOMOUS AGENT FOR MEETING PREPARATION ASSISTANCE

(71) Applicant: Toyota Research Institute, Inc., Los Altos, CA (US)

(72) Inventors: Saurabh R. Palan, Mountain View, CA (US); Thor Lewis, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 5 days.

(21) Appl. No.: 15/933,863

(22) Filed: Mar. 23, 2018

(65) Prior Publication Data

US 2019/0296926 A1 Sep. 26, 2019

(51) Int. Cl.
*H04L 12/18* (2006.01)
*G06K 9/00* (2006.01)

(52) U.S. Cl.
CPC ...... *H04L 12/1818* (2013.01); *G06K 9/00845* (2013.01); *H04L 12/1822* (2013.01); *H04L 12/1831* (2013.01)

(58) Field of Classification Search
None
See application file for complete search history.

(56) References Cited

U.S. PATENT DOCUMENTS

| | | | |
|---|---|---|---|
| 7,149,741 B2 | 12/2006 | Burkey et al. | |
| 8,767,948 B1 | 7/2014 | Riahi et al. | |
| 8,898,098 B1 | 11/2014 | Luechtefeld | |
| 2003/0023444 A1 | 1/2003 | St. John | |
| 2004/0166484 A1* | 8/2004 | Budke | G09B 19/00 434/433 |
| 2008/0214903 A1 | 9/2008 | Orbach | |
| 2009/0234718 A1* | 9/2009 | Green | G06Q 30/0203 705/7.32 |
| 2011/0283190 A1* | 11/2011 | Poltorak | G10L 13/033 715/716 |
| 2013/0278492 A1* | 10/2013 | Stolarz | G06F 3/01 345/156 |
| 2014/0074483 A1 | 3/2014 | van Os | |
| 2014/0223462 A1* | 8/2014 | Aimone | A61B 5/0476 725/10 |
| 2014/0350349 A1* | 11/2014 | Geurts | A61B 5/0022 600/300 |

(Continued)

OTHER PUBLICATIONS

O'Hear, "Julie Desk, an 'AI virtual assistant' that helps you schedule meetings and more, scores €2.5M funding", retrieved from the Internet: <https://techcrunch.com/2017/06/01/julie-desk-an-ai-virtual-assistant-that-helps-you-schedule-meetings-and-more-scores-e2-5m-funding/>, retrieved Oct. 2, 2017, 5 pages.

*Primary Examiner* — Shripal K Khajuria
(74) *Attorney, Agent, or Firm* — Christopher G. Darrow; Darrow Mustafa PC (57) ABSTRACT

Methods and systems for vehicle to operator communication for preparation for a meeting are disclosed. The methods and systems can include collecting meeting information regarding a meeting, transmitting the meeting information to an operator through a communication system, receiving emotional inputs reflecting an emotional state of a party, determining a phased emotional state for the party using the emotional inputs, and transmitting state information to the operator, the state information including the phased emotional state.

17 Claims, 6 Drawing Sheets

(56) References Cited

U.S. PATENT DOCUMENTS

| | | |
|---|---|---|
| 2015/0142704 A1 | 5/2015 | London |
| 2015/0269525 A1 | 9/2015 | Hazy |
| 2015/0314454 A1* | 11/2015 | Breazeal ............... B25J 9/0003 |
| | | 700/259 |
| 2016/0042648 A1* | 2/2016 | Kothuri .................. G06F 3/015 |
| | | 434/236 |
| 2016/0195856 A1 | 7/2016 | Spero |
| 2017/0139918 A1* | 5/2017 | Mulukuri .......... G06F 16/24578 |
| 2018/0167590 A1* | 6/2018 | Huang .................... H04N 7/18 |
| 2018/0181854 A1* | 6/2018 | Koukoumidis ........ G06N 3/006 |

\* cited by examiner

AUTONOMOUS AGENT FOR MEETING PREPARATION ASSISTANCE

TECHNICAL FIELD

Embodiments described herein generally relate operator-vehicle assistance. More specifically, embodiments generally relate to operator assistance in meeting preparation.

BACKGROUND

Operating a vehicle or riding in a vehicle requires a varying level of attention, depending on the level of autonomy of the vehicle. In some situations, operating or using a vehicle creates extended periods of low interaction for the operator or user. Most operators are driving in their vehicles alone and unable to perform other tasks during this time. There are a variety of tasks that an operator may need to address during the same time period. Currently, this time would be wasted, leaving some tasks unaddressed.

SUMMARY

The systems and methods described herein disclose an agent for meeting preparation in a vehicle. In one embodiment, an autonomous assistant system for vehicle-to-user meeting preparation is disclosed. The autonomous assistant system can include one or more processors; and a memory communicably coupled to the one or more processors. The memory can include an interaction awareness module including instructions that when executed by the one or more processors cause the one or more processors to receive one or more first emotional inputs and one or more second emotional inputs from at least one party during a first meeting, and to determine a phased emotional state using the one or more first emotional inputs and the one or more second emotional inputs. The memory can further include a monitoring module including instructions that when executed by the one or more processors cause the one or more processors to collect meeting information regarding a second meeting with the at least one party using a network. The memory can further include an agent interaction module including instructions that when executed by the one or more processors cause the one or more processors to transmit, using a communication system, the meeting information and the phased emotional state to an operator for use in the second meeting.

In another embodiment, a non-transitory computer-readable medium for vehicle-to-user meeting preparation is disclosed. The medium can store instructions that when executed by one or more processors cause the one or more processors to receive one or more first emotional inputs and one or more second emotional inputs from at least one party during a first meeting. The medium can further store instructions to determine a phased emotional state using the one or more first emotional inputs and the one or more second emotional inputs. The medium can further store instructions to collect meeting information regarding a second meeting with the at least one party using a network. The medium can further store instructions to transmit, using a communication system, the meeting information and the phased emotional state to an operator for use in the second meeting.

In another embodiment, a method for vehicle-to-user meeting preparation is disclosed. The method can include receiving one or more first emotional inputs and one or more second emotional inputs from at least one party during a first meeting. The method can further include determining a phased emotional state using the one or more first emotional inputs and the one or more second emotional inputs. The method can further include collecting meeting information regarding a second meeting with the at least one party using a network. The method can further include transmitting, using a communication system, the meeting information and the phased emotional state to an operator for use in the second meeting.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

A vehicle can be equipped with various technologies, including voice recognition, artificial intelligence, and/or machine learning. The vehicle can include autonomous assistant systems and methods which can help a user in a vehicle (e.g., the driver/operator or another user) prepare for a meeting. The autonomous assistant can provide the operator with various pieces of information prior to or in preparation for the meeting. In one embodiment, the autonomous assistant provides a summary of the operator's last meeting including detected meeting participant(s). In another embodiment, the autonomous assistant provides an agenda of the next meeting with the meeting participant(s). In another embodiment, the autonomous assistant provides social information related to the meeting participant(s) (e.g., birthdays, personal likes). In another embodiment, the autonomous assistant provides public information related to the content of the meeting or meeting participants. Further, the system and methods described herein can collect personality and interaction information regarding the user and the meeting participants. This personality information can be used to indicate the best methods to proceed in further meetings.

After the meeting, the autonomous assistant can obtain information from the operator regarding how they felt about the meeting and obtain any notes that the operator wants to associate with this particular meeting. To determine feelings or emotions regarding the meeting, the system and methods can include determining a phased emotional state regarding each of the participants. The emotional state at any one point in time may not reflect the overall emotional state of the participants regarding the meeting. As such, the system and methods can collect a plurality of instantaneous emotional states for the person, each of the participants or any combination thereof. The plurality of instantaneous emotional states can be used to determine the phased emotional state of the participant, or the emotional state of the participant as determined in gradual stages.

The phased emotional state can include a cumulative emotional state, interpersonal emotional states (e.g., emotional states between specific parties), team emotional states and others which are accumulated in a stepwise fashion from one or more sources. The autonomous assistant can also detect the user's emotional state before, during and/or after the meeting. Emotional states can be based on the content of the speech, the tone of the speech, the user's facial expressions, biometric sensors, direction of gaze, or other data indicative of mood or emotion and delivered before, during, or after the meeting. This information can be shared with the person at an appropriate time, such as prior to the next meeting. The information provided prior to or obtained subsequent to the meeting can also be shared with other members of the user's team. Embodiments disclosed herein are more clearly described with reference to the figures below.

Figure 1:
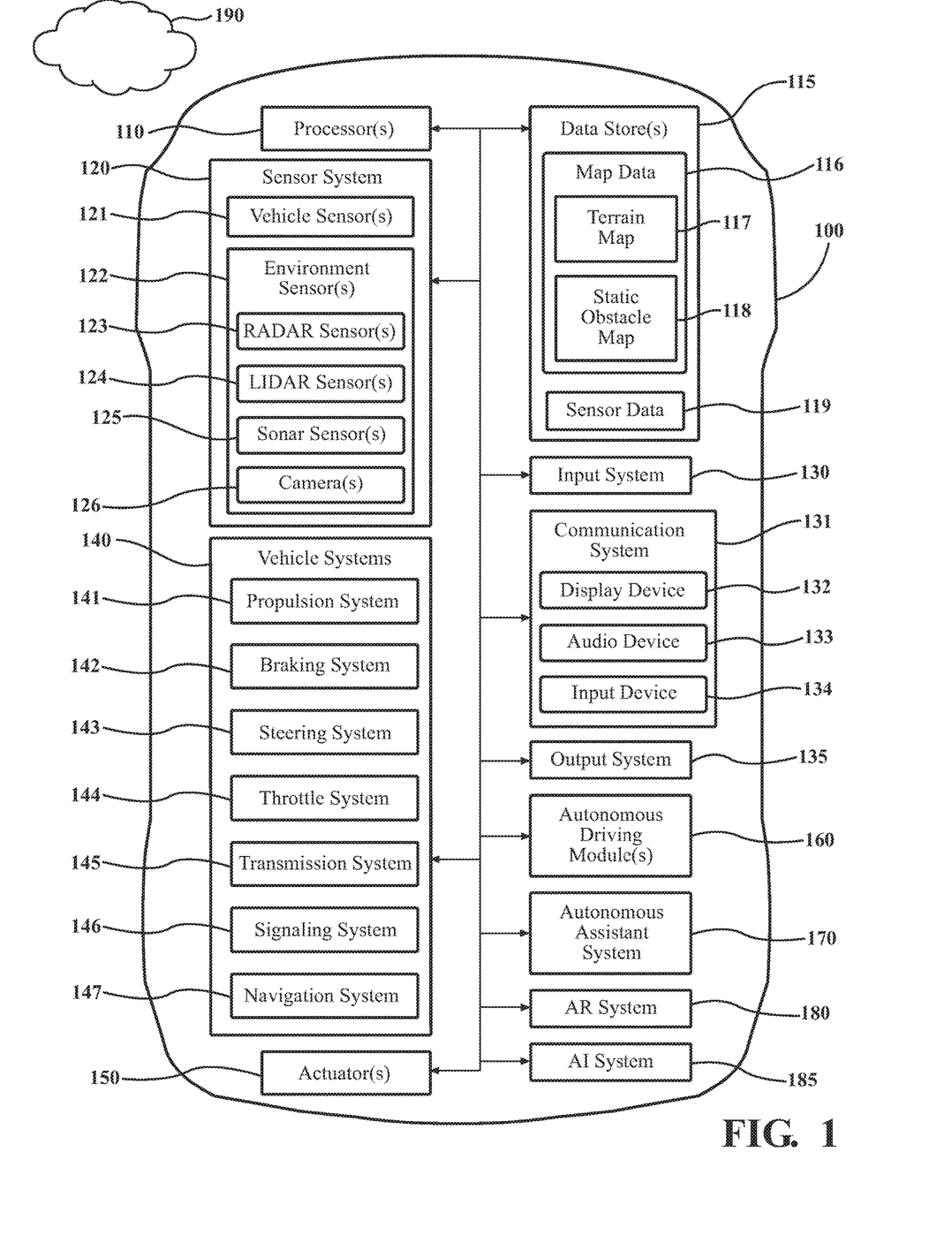
FIG. 1 is a flow diagram of a vehicle incorporating an autonomous assistant system, according to embodiments described herein.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, can operate at least semi-autonomously. The vehicle 100 can further include a communication system 131, which can include a display, an augmented reality (AR) system or other devices with capabilities to support such a communication system, and thus benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those having ordinary skill in the art, however, will understand that the embodiments described herein may be practiced using various combinations of these elements.

The vehicle 100 further includes an autonomous assistant system 170 that is implemented to perform methods and other functions as disclosed herein relating to communication between the vehicle and the operator for meeting preparation. The autonomous assistant system 170 can include a number of modules configured with instructions to perform the variety of functions listed below. In one example, the vehicle 100 is equipped with the autonomous assistant system 170, including monitoring module for collecting information about a meeting for an operator, an interaction awareness module having instructions to determine or anticipate emotional states of the operator, the participants, the observers (if any), or other parties at a meeting, and an agent interaction module having instructions to determine a phased emotional state of the parties and to enter into conversation with the operator to inform the operator regarding a future meeting, such as a meeting. The other modules or systems described herein can be in communication with all or a part of the autonomous assistant system 170.

Figure 2:
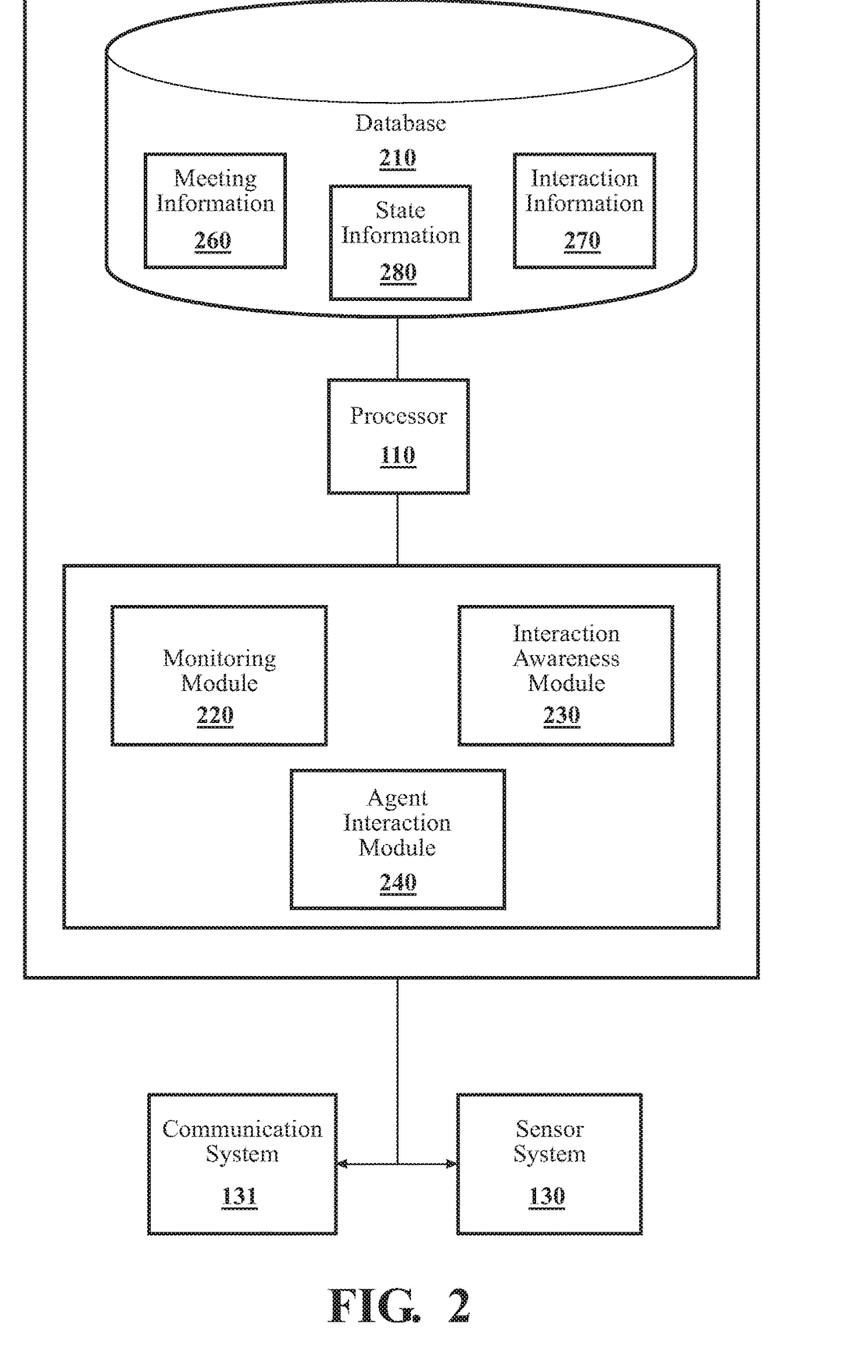
FIG. 2 is an illustration of an autonomous assistant system for operator interactions, according to embodiments described herein.

With reference to FIG. 2, one embodiment of the autonomous assistant system 170 is further illustrated. The autonomous assistant system 170 is shown as including a processor 110 from the vehicle 100 of FIG. 1. Accordingly, the processor 110 can be a part of the autonomous assistant system 170, the autonomous assistant system 170 can include a separate processor from the processor 110 of the vehicle 100, or the autonomous assistant system 170 can access the processor 110 through a data bus or another communication path. In one embodiment, autonomous assistant system 170 includes a data store 115 that can store a monitoring module 220, an interaction awareness module 230, and an agent interaction module 240. Further, the autonomous assistant system 170 can include artificial or computational intelligence elements, such as from an artificial intelligence (AI) system. The data store 115, as described in FIG. 1, can be a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110, cause the processor 110 to perform the various functions disclosed herein.

With continued reference to the autonomous assistant system 170, in one embodiment, the autonomous assistant system 170 can include the database 210. The database 210 can be stored in the data store 115. The database 210 is, in one embodiment, an electronic data structure stored in the data store 115 or another data store and that is configured with routines that can be executed by the processor 110 for analyzing stored data, providing stored data, organizing stored data, and so on. Thus, in one embodiment, the database 210 stores data used by the modules 220, 230, and 240 in executing various functions. In one embodiment, the database 210 includes meeting information 260 collected by the monitoring module 220. In another embodiment, the database 210 can include further interaction information 270 created by the interaction awareness module 230.

The autonomous assistant system 170 can begin with instructions from the monitoring module 220. In one embodiment, the monitoring module 220 includes instructions to acquire meeting information 260 that characterizes the meeting, the parties involved or observing the meeting, locations, times, and so on. It should be appreciated that the present disclosure provides an exemplary listing of aspects associated with the operator that can be monitored to produce the meeting information 260. However, this listing is not to be construed as limiting and is provided as an exemplary list of possibilities for purposes of this discussion.

The monitoring module 220 can generally include instructions that function to control the processor 110 to collect meeting information regarding a meeting. The meeting can be an initial meeting, a second or follow-up meeting between two or more parties. The meeting can be a general meeting or include a specific subject matter focus, such as work performance, specific deadlines, areas for growth or development, educational goals, or others. The meeting information is information which is related to the meeting or participants which are known or suspected to attend said meeting/meeting. The meeting information can extend to people, places, things, objects or others which might be informative to the meeting, the participants of the meeting, or the setting of the meeting. The meeting information can be received prior to or during the meeting occurrence.

The meeting information can be collected using systems available to the vehicle 100, such a network and one or more sensors of the sensor system 120. In one embodiment, the meeting information can be collected from publically available or semi-publically available sources. Examples of publically or semi-publically available sources includes social media (e.g., Facebook™, Linked-In™, Twitter™, etc.), information available through a search engine, published information, literature, or other sources which are available. In another embodiment, the meeting information can be collected from private sources, such as interoffice networks, e-mail sources, personal computers or others which are made available to the autonomous assistant system 170.

The monitoring module 220 can then to transmit the meeting information to an operator through a communication system, such as through the communication system 131, described with reference to FIG. 1. The meeting information 260 is a collection of information regarding the meeting, the location, the participants, the scheduling and other facts and data about the meeting. The meeting information 260 can be stored in a database, such as a database 210. The monitoring module 220 can communicate the meeting information 260 to the operator through a communications device. The communications device can be a device such as an audio device, a display device or other forms of communication with the operator. In one embodiment, the communications device is an augmented reality (AR) system, such as the AR system 180 described with reference to FIG. 1. One skilled in the art will understand, based on the disclosure herein, the breadth of embodiments which can be incorporated as a communications device using the embodiments described herein.

The interaction awareness module 230 generally includes instructions that function to control the processor 110 to receive one or more first emotional inputs and one or more second emotional inputs reflecting an emotional state of at least one party. The emotional inputs are inputs derived from the behavior or mannerisms of the party being observed. The emotional inputs can be received during an interaction, such as during the first meeting. The first emotional input can be an emotional input taken at a first point in time. The second emotional input can be the emotional input which is taken at a second period of time, where the second period of time is different from the first period of time. Thus, the interaction awareness module 230 generally includes instructions that function to control the processor 110 to retrieve data from sensors of a sensor system 120 of the vehicle 100 and to acquire interaction information 270. In one embodiment, the interaction awareness module 230 collects emotional inputs as part of the interaction information 270 from one or more sensors. The sensors can be external sensors which are part of a secondary source (e.g., cameras in a conference room) or the sensors can be part of the sensors available in the vehicle 100, such as sensors of the communication system 131. In one example, the communication system 131 is detachable from the vehicle 100. The communication system 131 is then brought with the operator to the meeting, where it is allowed to observe data from the participants and the operator. This data can either be actively transmitted, or stored to be transmitted to the vehicle 100 once reconnected.

The interaction information 270 is information which indicates the emotional state of a party, which includes information that characterizes a present mental state, a present cognitive load, audible signs of worry or distress, facial and eye movement, biological responses/conditions, language (including tone and inflection), and so on. Emotional state, as used herein, refers to a specific base emotion and intensity of said emotion displayed by the party being observed. Average level of focus over time can include averages of a direction of a gaze, a path/track of the gaze. The average biometric readings can include averages of heart rate, blood pressure, respiratory function, blood oxygen levels, perspiration levels, pupil dilation/size, brain activity (e.g., EEG data) or combinations thereof. The interaction awareness module 230 can then store the interaction information 270 in a data store, such as the database 210. It should be appreciated that the present disclosure provides an exemplary listing of aspects associated with the operator that can be monitored to produce the interaction information 270. However, this listing is not to be construed as limiting and is provided as an exemplary list of possibilities for purposes of this discussion.

The interaction awareness module 230 further includes instructions to determine a phased emotional state for the at least one party using the one or more first emotional inputs and the one or more second emotional inputs. The phased emotional state is the combination of two or more emotional states to determine the steady state emotion achieved by the event. In the case of a meeting, the phased emotional state can be the emotional state achieved from the overall meeting, the emotional state related to a specific interaction. The phased emotional state can also include information on the rate of recovery from a specific tiered emotional state, such as recovery from shock and reaching a baseline of frustration related to a specific event. The phased emotional state can be determined for any observed party, such as the operator, the participants, the observers (if any) or others. The phased emotional state can be the emotional state related to a specific subject matter (e.g., a participant who gets upset more easily during discussions of finance). The phased emotional state, once determined, can be stored in a data store, such as part of the state information 280 in the database 210.

In another embodiment, the autonomous assistant system 170 can include meeting information from a previous interaction. In one embodiment, the operator entered a previous meeting where the interaction awareness module 230 collected phased emotional state information regarding one or more participants. In another embodiment, a separate autonomous assistant system 170 collected information regarding the phased emotional state of one or more participants. The previous interaction can have included one or more parties different from the parties of the current meeting. Further, the previous interaction can have occurred at a different location. The phased emotional state can be stored in a remote data store, such as a data store similar in nature to the data store 115, described with reference to the vehicle 100 of FIG. 1. The interaction awareness module 230 can receive the phased emotional state information from the remote store, for use with the phased emotional state stored in state information 280. The state information 280 can be stored in the database 210

The agent interaction module 240 generally includes instructions that function to control the processor 110 to transmit state input to the operator. The state information 280 can be transmitted to the operator using the communication system 131. The state information 280 can include emotional state information about the parties, such as the phased emotional state as described above. The state information 280 can further include the relation of the emotional states to specific events, such as specific conversations, subject matters, emotional states between individual parties and others. The state information 280 can be presented as emotional states and separated by timing, subject matter, person involved or other parameters, as desired.

The agent interaction module 240 can further include instructions to transmit, using the communication system 131, the meeting information and the phased emotional state to an operator for use in a second meeting. In one embodiment, the agent interaction module 240 can transmit the information using the communication system 131. The agent interaction module 240, through the communication system 131, can transmit natural language speech via the audio device 133 in response to a request for information from the operator, such as to plan for another meeting. The natural language speech can be responsive to a conversation with the operator. Natural language speech is synthesized speech which mimics the form, fluidity, articulation, speed and other factors related to natural human speech. The autonomous assistant system 170 can further respond with visualization through the display device 132 or through the AR system 180. Visualizations can include charts graphs, dates time, emotional states, topics for discussion, expected positive/negative interactions and others.

The agent interaction module 240 can be configured to initiate a conversation with the operator. The agent interaction module 240 can present the future event information through the communication system 131. The future event can be another planned interaction with one or more of the participants or observers, such as a future meeting. The agent interaction module 240 can then continue discussing the future event or allow the operator to direct the conversation. When the operator is directing the conversation, the agent interaction module 240 can reference topics as necessary to continue the conversation with the operator. The agent interaction module 240 can provide guidance regarding the future events. The guidance can include certain parties with which the system 170 noticed success or failure, discussion topics which are likely to work positively for negotiations, areas of interest for participants, and others which may be helpful for increased success in future events.

Referring further to FIG. 1, the guidance can be provided as part of an artificial intelligence (AI) system 185. The AI system 185 can use machine learning or other algorithms to determine positive and negative results of interactions in light of a current or previous emotional state. The AI system 185 can be developed in the vehicle 100, based on the cumulative interaction with one or more operators over a period of time. In another embodiment, the AI system 185 can be developed and stored remotely, using the interactions of a plurality of operators over a period of time.

As such, the autonomous assistant system 170, as described in FIGS. 1 and 2, can provide numerous benefits to an operator. The autonomous assistant system 170, as described here, learns about the operator, and the meeting participants and applies their emotional states to your current situation based to help in preparation for current and future meetings, such as the first meeting and the second meeting. In doing this, the autonomous assistant system 170 can help plan for meetings and events, as well as offer guidance to the operator at the same time.

Figure 3A:
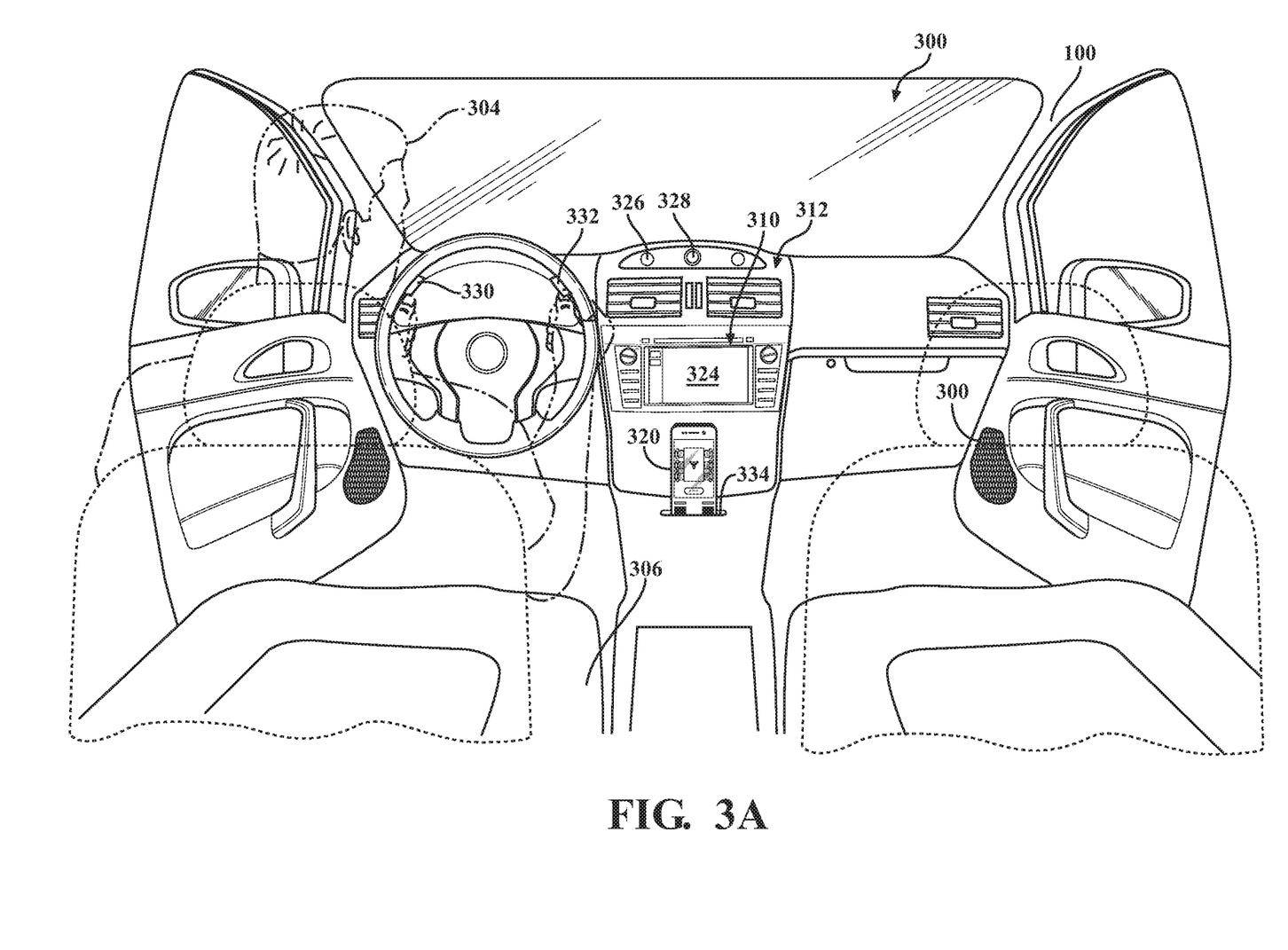
FIG. 3A is a schematic illustration of a vehicle interior incorporating elements of the autonomous assistant system, according to embodiments described herein.
Figure 3B:
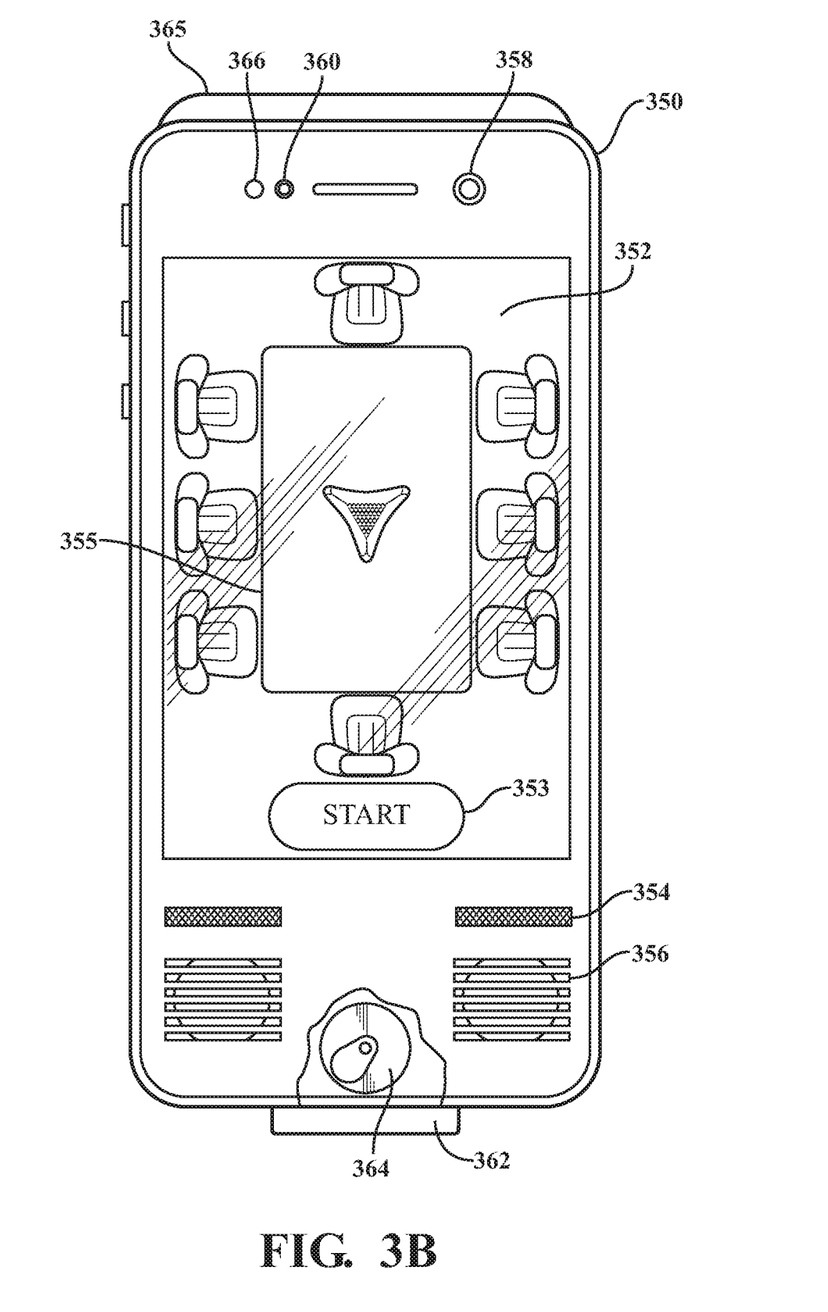
FIG. 3B is schematic illustration of a communication device incorporating elements of the autonomous assistant system, according to embodiments described herein.

FIGS. 3A and 3B depicts an interior 300 of a vehicle 100 with an autonomous assistant system 170, according to embodiments described herein. The autonomous assistant system 170 can have an interface 310. The interface 310 can be either permanently integrated or portable. In this embodiment, the interface 310 is shown as an integrated system. In one or more embodiments, the interface can be substantially similar to the communications system 131, described with reference to the vehicle 100 in FIG. 1. In further embodiments, the interface 310 can include portions of the communication system 131. In this example, the interface 310 is shown with speakers 320 and a display 324. The speakers 320 can be used as part of the audio device 133 and the display 324 can be used as part of the display device 132 of the communication system 131. The interface 310 can incorporate the autonomous assistant system 170, including the module 220, 230 and 240, described with reference to FIGS. 1 and 2. The interface 310 can be used in a number of different ways, some example scenarios of which are discussed below for illustrative purposes.

Referring now to FIG. 3A, the interface 310 is shown positioned in the dashboard 302. An operator 304 is situated in the operator's seat 306 of the illustrative vehicle 100. Some features of the exemplary interface 310 shown in FIG. 3 are incorporated into existing components of the vehicle 100, although this need not be the case. For example, speakers 320 and a display 324 are installed in a vehicle dashboard 302, a device syncing/docking area 334 (which may include a hard-wired communication port) is defined in a center console 312. A communication device 350 can be positioned in the center console 312, such as in connection with device syncing/docking area 334. The center console 312 can also include one or more microphones, such as a microphone 326, and one or more image capture devices, such as a camera 328.

The vehicle 100 can be connected with one or more biometric systems, such as a biometric monitor 330. The biometric monitor 330 is shown in this example as integrated into the steering wheel 332. However, the location in this figure is not intended to be limiting. The biometric monitor 330 can be a device which is capable of determining one or more physiological aspects about the operator or a passenger. Physiological aspects can include heart rate, blood pressure, pulse oximetry, comparative vasodilation levels, or others. In one example, the biometric monitor 330 is a heart rate monitor using near infrared spectroscopy or electrical impedance.

Referring now to FIG. 3B, the communication device 350 is shown in greater detail, according to one embodiment. The communication device 350 can be a computing device, having a processor, data store, connections, inputs and outputs, as described with reference to the vehicle 100 in FIG. 1. The communication device 350 is depicted here as a hand-held device, however size, shape and configuration is not intended to be limiting. The communication device 350 can be of any size, shape or configuration which allows for the availability of one or more sensors in a meeting. The communication device 350 can include a variety of output devices, such as a display 352. In one embodiment, the display 352 is a touch-screen display, in that it can accept input based on touch or other manual manipulation of one or more buttons which are produced on the display 352. Shown here, the display 352 is a touch-screen display having a picture of a conference table 355, the conference table 355 including six (6) chairs. Further output devices can include vibration device 364, a light 366, or others. Below the conference table 355 is a start button 353. The operator can press the start button 353, once the meeting is ready to start. The communication device 350 can allow for manual input of meeting information. In one embodiment, the operator 304 can select a target participant from the meeting by touching a portion of the conference table 355 corresponding to that participant.

The communication device 350 can also include a variety of sensors for collecting information in the environment, such as from participants in a meeting. The sensors of communication device 350 can include one or more audio input devices, such as the microphones 354. The sensors of the communication device can further include video input devices, such as a camera 358 and a camera 360. The video input devices can be of different types, such as the camera 358 can be designed for capturing images in the visible spectrum and the camera 360 can be designed to capture images in the infrared spectrum (e.g., a thermographic camera). Further sensors can include RADAR, LIDAR, gyroscopic sensors, accelerometers, proximity sensors, or others useful in determining objects or people, such as in a meeting, or the actions or events related thereto. In one embodiment, the communication device 350 can include a RADAR device 365. Information about the meeting area can be determined using the one or more sensors of the communication device 350 described above, collected and stored from a previous visit to this environment, downloaded from a secondary source (e.g., a database), or combinations thereof. In one embodiment, the communication device 350 uses the RADAR device 365 to compile a map of the meeting area.

The information collected by the communication device 350 can be transmitted or retained in a variety of ways, such as actively uploaded to the vehicle 100, actively uploaded to a remote server through the network 190 (depicted here as a cloud), stored locally in the communication device 350 for uploading to the vehicle 100, or others. The communication device 350 can further include a dock connection 362. The dock connection 362 can connect the communication device 350 with the device syncing/docking area 334 of the vehicle 100.

Referring now to FIGS. 3A and 3B, the monitoring module 220 of autonomous assistant system 170 can begin prior to the first meeting by capturing information about the operator 304. The monitoring module 220 can be connected to a network, such as the network 190. The network 190, which can be wired or wireless, can allow the autonomous assistant system 170 to communicate with other computing devices, locally or remotely, such as over a network protocol (e.g., Ethernet or similar protocols). The monitoring module 220 can connect with public and private sources, as described above with reference to FIG. 2. The monitoring module 220 can then determine that the operator 304 has a first meeting, which the operator 304 is scheduled to attend. The monitoring module 220 can then collect meeting information regarding the first meeting, such a specific time frame, location, parties in attendance and other details as appropriate. The meeting information can be stored in a data store, such as a database. As well, the autonomous assistant system 170 collects information on further physiological data, such as biometrics using eye scanning, facial monitoring and others through the camera 328. These biometrics as well as other meeting information can then be accumulated by the monitoring module 220 and stored in a database as meeting information, such as in the meeting information 260 located in the database 210, as described above with reference to FIG. 2.

The monitoring module 220 then transmits the meeting information to the operator regarding a first meeting. The monitoring module 220 can use the interface 310, the communication device 350, or other devices capable of interacting with or integrating with the communication system 131. The monitoring module 220 can then convey meeting information to the operator 304, including meeting notes, agenda topics, meeting participants, information about the meeting participants, scheduling conflicts for one or more meeting participants, emotional information gained from a previous meeting, such as the first meeting, or other information. The monitoring module 220 can provide the meeting information to the operator in a number of formats, including written visual, pictorial visual, spoken word, combinations thereof, or other formats. After having received the first meeting information, the operator can continue into the first meeting.

Figure 4:
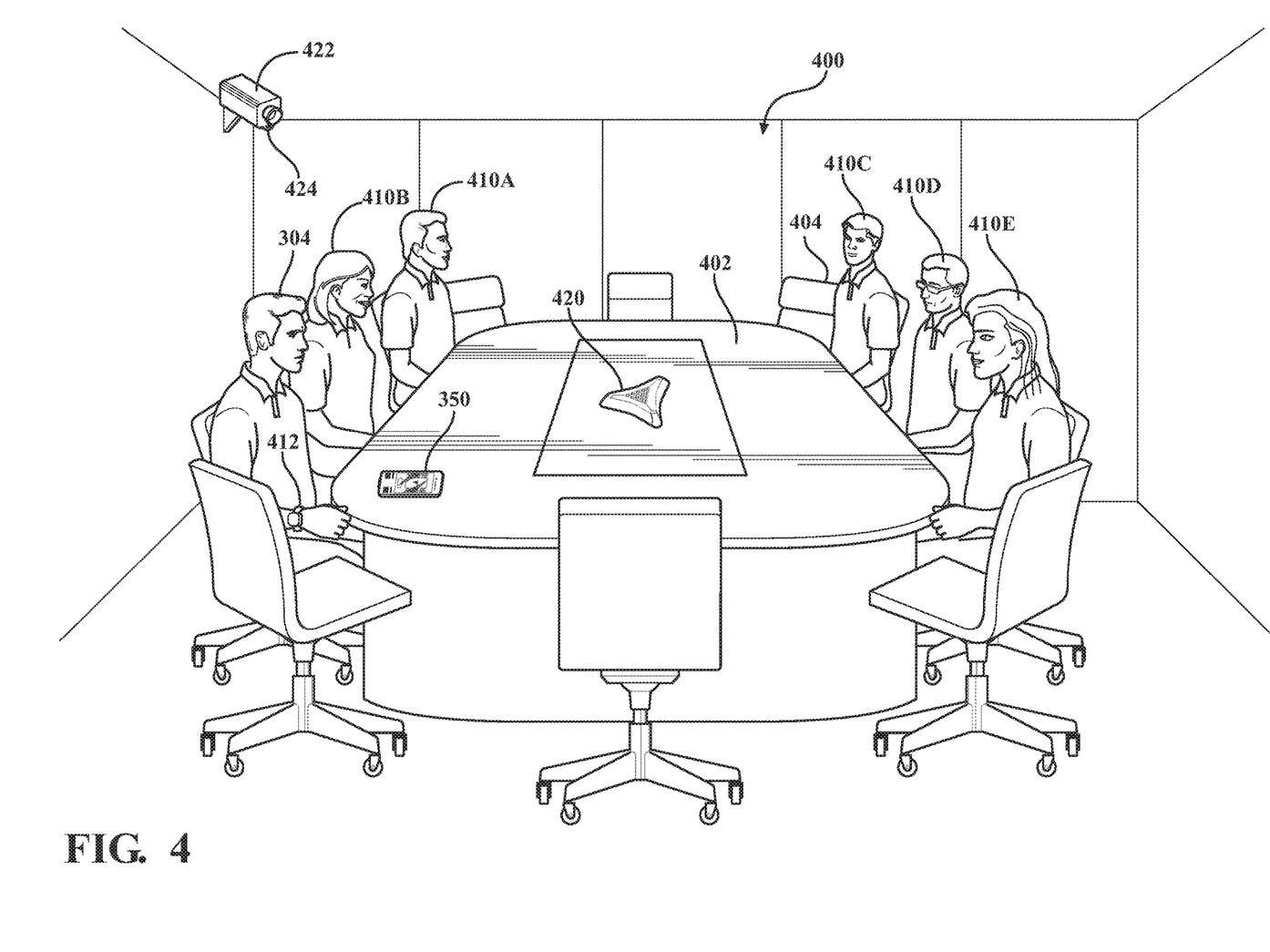
FIG. 4 is an illustration of a meeting room incorporating elements of the autonomous assistant system, according to embodiments described herein.

FIG. 4 depicts a meeting room 400 used with the autonomous assistant system 170, according to embodiments described herein. The meeting room 400 is a room or space where the meeting will be held. The meeting room 400 includes one or more components, as shown in FIG. 4. However, this is not intended to be limiting. The meeting room 400 can be any room or location which serves the function of holding a meeting. The meeting room 400 can include a table 402 and a seating arrangement 404. Optionally, the meeting room 400 can further include one or more sensors. Sensors available in the meeting room 400 can include one or more of the sensors of the sensor system 120, one or more of the sensors described with reference to the communication device 350, or combinations thereof. In one embodiment, the meeting room 400 can include a camera 422 and/or a microphone 424.

One or more participants 410A-410E and the operator 304 can be seated at a seat in the seating arrangement 404. The one or more participants, depicted here as five (5) participants 410A-410E, are people who are interacting with at least one other person as part of the first meeting. Though depicted here as five (5) participants 410A-410E, the number of participants can be more or fewer, depending on the meeting agenda and number of participants that are scheduled, invited or otherwise attend said meeting. The operator 304 can have the communication device 350, described with reference to FIGS. 3A and 3B. The communication device 350 can be positioned on the table 402. A conferencing device 420 can be positioned on the table 402. The conferencing device 420 can connect with one or more remote participants or one or more observers (not shown). Observers are people who exist within the sensor range of the communication device 350 or other sensors, but are not physically present in the meeting room.

The interaction awareness module 230 includes instructions to receive one or more first emotional inputs and one or more second emotional inputs reflecting an emotional state of at least one party. The party, as described above, can be the operator 304, any of the one or more participants 410A-410E or others. The first emotional input and the second emotional input can be as described above, with reference to FIG. 2. The interaction awareness module 230 can be receive information from the sensors in a number of ways. In one embodiment, the interaction awareness module 230 can send instructions to the communication device 350 and/or the sensors in the meeting room (e.g., the camera 422 and/or the microphone 424). The instructions can include collecting the interaction information, such as a first emotional input and a second emotional input. The interaction information can be substantially similar to the interaction information described with reference to FIG. 2. In another embodiment, the interaction awareness module 230 can be integrated into the communication device 350, wherein the interaction awareness module 230 collects the interaction information. Further combinations of the modules 220, 230, and 240 of the autonomous assistant system 170 and the communication device 350 are envisioned without specific recitation herein.

As the meeting progresses, the interaction awareness module 230 collects interaction information for the operator 304, and the participants 410A-410E. The interaction information can be substantially similar to the interaction information 270, described with reference to FIG. 2. In one embodiment, the interaction information can include the relationship between the parties, each party's general tone and demeanor, emotional states over a period of time, topics of discussion, and others as described previously. The interaction information can be stored in a data store, such as the interaction information 270 stored in a database 210, described with reference to FIG. 2.

In one example, the interaction awareness module 230 collects information about the interaction between operator 304 and participant 410D. In this interaction, the interaction awareness module 230 detects that participant 410D is the boss of operator 304, that the conversation is regarding salaries and payment information, that participant 410D begins on the high side of angry (e.g., the first emotional state), as determined by facial expression, voice inflection and tone, and heat charts collected by the camera 360 of the communication device 350, and that the participant 410D calms down to frustrated (e.g., the second emotional state) with an apparent relation to logical expression of numerical data. The interaction awareness module 230 further determines that the operator 304 began the conversation with the participant 410D as calm (e.g., the first emotional state) based on facial expression, pupil dilation, voice inflection and tone, blood pressure (taken from a blood pressure device 412), and that the operator 304 becomes nervous (e.g., the second emotional state) with an apparent relation to discussion of pay rates and due dates. Further interaction information is collected between all parties, including the above over the course of the meeting.

The interaction awareness module 230 further includes instructions to determine a phased emotional state for the at least one party using the one or more first emotional inputs and the one or more second emotional inputs. The phased emotional state can be substantially similar to the phased emotional state, described with reference to FIG. 2. In one example, the interaction awareness module 230 collects information about the emotional state of the operator 304 at twenty-seven (27) points during the meeting. The interaction awareness module 230 then determines that the phased emotional states include anger with participant 410C, nervousness with participant 410D, emotion of the meeting is most positive and improves from the current state when discussing "Exciting Project A", a new product line the operator 304 is working on, and the overall meeting emotion was calm to happy. The interaction awareness module 230 then determines a variety of phased emotional states for each of the parties based on the anticipated needs or desires of the operator 304. Further, the interaction awareness module 230 can learn over time regarding the needs or desires of the operator 304, thus improving the autonomous selection of data processing. The phased emotional state can be stored in a data store, such as part of the state information 280 of the database 210, described with reference to FIG. 2.

After the meeting is finished, the operator 304 can leave the meeting room 400 and return to the vehicle 100. With reference to FIGS. 3A and 3B, the operator 304 can connect the communication device 350 to the device syncing/docking area 334 of the vehicle 100. As stated previously, the communication device 350 can communicate with the vehicle 100 through a variety of sources, such as the device syncing/docking area 334, the network 190, or other available sources. Further, the communication device 350 can have transferred the interaction information and/or the phased emotional state during the meeting or after the meeting.

The agent interaction module 240 can then transmit, using the communication system, state information to the operator 304. The state information can be substantially similar to the state information 280, described with reference to FIG. 2. The state information can be transmitted and/or presented using one or more devices in the vehicle 100, such as the display 324 of the interface 310, the display 352 of the communication device 350, speakers 356, the speakers 320, the AR system 180, described with reference to FIG. 1, combinations thereof, or others. The state information can include information regarding the phased emotional states of the parties to the meeting, the instantaneous emotional states collected over the meeting, The agent interaction module 240 can then transmit information regarding a future event to the operator, upon receipt of input from the operator 304 regarding the future event. The input from the operator 304 can be either concurrent with the transmission (e.g., the operator enters a future meeting after the meeting here) or have occurred previously (e.g., the operator 304 has already entered all meeting events for the next three (3) months prior to the meeting here). The future event can be another meeting, a social gathering or other event where the operator 304 can meet one or more of the other parties from the first meeting. In one embodiment, the future event is the second meeting. The information can include guidance as to what discussion points worked and what didn't, future meeting dates where one or more of these participants will be in attendance, and others.

Thus, the autonomous assistant system 170, described above, can provide numerous benefits to the operator. Using the autonomous assistant system 170, the operator 304 can prepare for a meeting and collect emotional information for use in future meetings. Thus, the system described above provides information and guidance that can help the operator 304 with interacting with other parties in a meeting. Further, these benefits can be transferred between autonomous vehicles and manual vehicles, allowing the operator to remain vigilant for requests from an autonomous vehicle. In autonomous vehicles, the autonomous assistant system 170 help with preparation during the commute, allowing the operator 304 to use their time more valuably.

Figure 5:
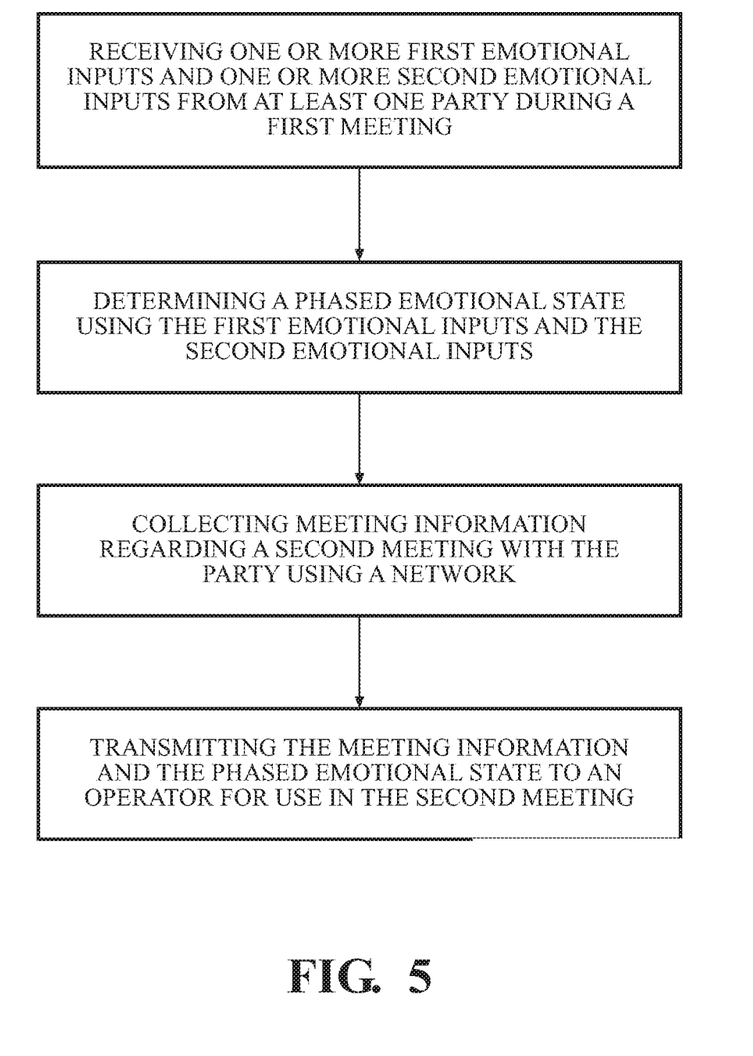
FIG. 5 is a flow diagram of a method for interacting with an operator for meeting preparation, according to embodiments described herein.

FIG. 5 is a flow diagram of method 500 for interaction with an operator for meeting preparation, according to embodiments described herein. The method 500 includes providing meeting details and preparation to an operator. The method 500 then collects emotional information during the meeting and produces a phased emotional state. The phased emotional state and the interaction information collected can then be provided to the operator, as part of a rundown of the meeting. The method 500 can begin by receiving one or more first emotional inputs and one or more second emotional inputs from at least one party during a first meeting, at 502. A phased emotional state can be determined for the party using the one or more first emotional inputs and the one or more second emotional inputs, at 504. Meeting information can then be collected regarding a second meeting with the at least one party using a network, at 506. Then, the meeting information and the phased emotional state can be transmitted to an operator for use in the second meeting, at 508.

The method 500 can begin by receiving one or more first emotional inputs and one or more second emotional inputs from at least one party during a first meeting, at 502. The method 500 can include collecting interaction information about the parties of the first meeting. The interaction information can include the first emotional inputs and the second emotional inputs. The interaction information can be collected using one or more sensors, such as sensors of the communication device 350. The first emotional inputs and the second emotional inputs can be collected during a meeting from a variety of parties, including the operator, the participants, the observers (if any) or combinations thereof. The first emotional inputs and the second emotional inputs can be indicative of the emotional state of a party at a specific point in time and/or under a specific circumstance. The interaction information can be collected as part of a system, such as the autonomous assistant system 170 described with reference to FIG. 2. In one embodiment, the interaction awareness module 230 can include instructions to receive one or more first emotional inputs and one or more second emotional inputs reflecting an emotional state of at least one party. The sensors can be sensors as described above with reference to FIGS. 1-3B. The interaction information can be stored in a data store, such as the interaction information 270 stored in the database 210, described with reference to FIG. 2.

A phased emotional state can be determined for the party using the first emotional inputs and the second emotional inputs, at 504. The phased emotional state is an analytical result from considering two or more detected emotional inputs, to determine the underlying or resultant emotional state of the party. The phased emotional state can include temporal relationships, interpersonal relationships or other factors as described above. Further, the phased emotional state can include a determination of the effects of one party's emotional state on another party's emotional state. The phased emotional state can be substantially similar to the phased emotional state described with reference to FIG. 2. The phased emotional state can be stored in a data store, such as the phased emotional state stored in the state information 280 as part of the database 210, described with reference to FIG. 2. The phased emotional state can be determined and the state information can be stored as part of a system, such as the autonomous assistant system 170 described with reference to FIG. 2. In one embodiment, the interaction awareness module 230 can include instructions to determine a phased emotional state for the at least one party using the first emotional inputs and the second emotional inputs. The state information can be stored in a data store, such as the state information 280 stored in the database 210, described with reference to FIG. 2.

The method 500 can include collecting meeting information regarding a second meeting, at 506. The meeting information can be collected using a network, such as the network 190, described with references to FIG. 1. The meeting information can be substantially similar to the meeting information 260, described with reference to FIG. 2. The meeting information is received prior to the meeting occurrence. The meeting information can be collected from public and private sources, as described above. The meeting information can be collected as part of a system, such as the autonomous assistant system 170 described with reference to FIG. 2. In one embodiment, the monitoring module 220 can include instructions to collect, using a network and one or more sensors, meeting information regarding a meeting. The sensors can be sensors as described above with reference to FIGS. 1-3B. The meeting information can be stored in a data store, such as the meeting information 260 stored in the database 210, described with reference to FIG. 2.

The meeting information and the phased emotional state can then be transmitted to an operator for use in the second meeting, at 508. The communication system can include a variety of communication devices, such as displays, speakers, microphones and others. The input and output devices can be substantially similar to or incorporate components of the AR system 180, the interface 310, the communication device 350, or combinations thereof described with reference to FIGS. 1-3B. The meeting information can be transmitted as part of a system, such as the autonomous assistant system 170 described with reference to FIG. 2. In one embodiment, the monitoring module 220 can include instructions to transmit the meeting information to an operator through a communication system. The meeting information can be stored in a data store, such as the meeting information 260 stored in the database 210, described with reference to FIG. 2.

The state information can be transmitted using the communications system 131, described with reference to FIGS. 1-3B. The state information can include the phased emotional state, instantaneous emotional states, topics and how those topics were received by the parties, and others. The state information can be substantially similar to the state information 280, described with reference to FIG. 2. The communication system can include a variety of communication devices, such as displays, speakers, microphones and others. The input and output devices can be substantially similar to or incorporate components of the AR system 180, the interface 310, the communication device 350, or combinations thereof described with reference to FIGS. 1-3B. The state information can be transmitted as part of a system, such as the autonomous assistant system 170 described with reference to FIG. 2. In one embodiment, the agent interaction module 240 can include instructions to transmit, using the communication system, state information to the operator, the state information including the phased emotional state.

Other and further embodiments of the methods and systems described above are contemplated, including combinations of or deletions from said methods, without specific recitation thereof. In one embodiment, the monitoring module further includes instructions to collect information about a previous interaction. In another embodiment, the agent interaction module further includes instructions to transmit information regarding a future event to the operator, upon receipt of input from the operator regarding the future event. In another embodiment, the agent interaction module further includes instructions to provide guidance for an interaction with one or more participants at the future event, wherein the future event is a second meeting. In another embodiment, the meeting information includes interpersonal information regarding one or more participants. In another embodiment, the at least one party includes the operator, a participant, an observer, or combinations thereof. In another embodiment, the one or more first emotional states are collected at a first time point and the one or more second emotional states are collected at a second time point, the first time point being separate from the second time point. In another embodiment, the communication system includes the communication device, the communication device having one or more sensors.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing devices to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous driving module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle can further include a communication system 131. The communication system 131 can be include a display device 132, audio devices 133 (e.g., speakers and microphones), and one or more input devices 134. The one or more input devices can include sensors, such as cameras, infrared devices, biometric devices, or others. The input devices 134 can further include a touch screen or manual buttons. The communications system can be in communication with the autonomous assistant system 170, either locally or remotely, such as through a network 190. The communication system 131 can be connected with the vehicle permanently or semi-permanently. Further, the communication system 131 can be divided into components, with portions thereof being permanently part of the vehicle 100, while other components of the communication system 131 can be removed.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the autonomous assistant system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the autonomous assistant system 170, and/or the autonomous driving module(s) 160 may control some or all of these vehicle systems 140 and, thus, may be partially or fully autonomous.

The processor(s) 110, the autonomous assistant system 170, and/or the autonomous driving module(s) 160 can be operably connected to communicate with the various vehicle systems 140 and/or individual components thereof. For example, returning to FIG. 1, the processor(s) 110, the autonomous assistant system 170, and/or the autonomous driving module(s) 160 can be in communication to send and/or receive information from the various vehicle systems 140 to control the movement, speed, maneuvering, heading, direction, etc. of the vehicle 100. The processor(s) 110, the autonomous assistant system 170, and/or the autonomous driving module(s) 160 may control some or all of these vehicle systems 140.

The processor(s) 110, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the autonomous driving module(s) 160 can control the direction and/or speed of the vehicle 100. The processor(s) 110, and the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data. The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source.

It should be appreciated that the AR system 180 can take many different forms but in general functions to augment or otherwise supplement viewing of objects within a real-world environment surrounding the vehicle. That is, for example, the AR system 180 can overlay graphics using one or more AR displays in order to provide for an appearance that the graphics are integrated with the real-world through, for example, the windshield of the vehicle 100. Thus, the AR system 180 can include displays integrated with the windshield, side windows, rear windows, mirrors and other aspects of the vehicle 100. In further aspects, the AR system 180 can include head-mounted displays such as goggles or glasses. In either case, the AR system 180 functions to render graphical elements that are in addition to objects in the real-world, modifications of objects in the real-world, and/or a combination of the two. In one embodiment, at least one AR display of the AR system 180 fuses a real-time image from a camera (e.g., exterior facing camera) of at least part of the surroundings of the vehicle 100 with synthetic objects (e.g., rendered graphical elements) from the AR system 180 and/or the autonomous assistant system 170. As one example, a monitor (i.e., AR display) is integrated within or just above a dashboard of the vehicle 100 and is controlled to display a fused view of graphical elements rendered by the AR system 180 with real-world images from the camera. In this way, the AR system 180 can augment or otherwise modify a view of an operator/passenger in order to provide an enriched/embellished visual sensory experience. The noted functions and methods will become more apparent with a further discussion of the figures.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:
1. An autonomous assistant system for vehicle-to-user meeting preparation, comprising:
   one or more processors; and
   a memory communicably coupled to the one or more processors and storing:
   an interaction awareness module including instructions that when executed by the one or more processors cause the one or more processors to receive one or more first emotional inputs and one or more second emotional inputs from at least one party during a first meeting, and to determine a phased emotional state using the one or more first emotional inputs and the one or more second emotional inputs, the one or more first emotional inputs being collected at a first time point and the one or more second emotional inputs being collected at a second time point, the first time point being separate from the second time point, the phased emotional state being a cumulative emotional state over a time period from at least the first time point to the second time point;
   a monitoring module including instructions that when executed by the one or more processors cause the one or more processors to collect meeting information regarding a second meeting with the at least one party using a network; and an agent interaction module including instructions that when executed by the one or more processors cause the one or more processors to transmit, using a communication system, the meeting information and the phased emotional state to an operator for use in the second meeting.

2. The autonomous assistant system of claim 1, wherein the monitoring module further comprises instructions to collect, prior to the first meeting, the meeting information regarding the first meeting, the meeting information being transmitted to the operator through the communication system.

3. The autonomous assistant system of claim 1, wherein the interaction awareness module further comprises instructions to prepare guidance using the meeting information and the phased emotional state for the second meeting, and to transmit, using the communication system, the guidance and the phased emotional state to the operator for use in the second meeting.

4. The autonomous assistant system of claim 3, wherein the guidance comprises one or more interaction topics with one or more participants at the second meeting.

5. The autonomous assistant system of claim 1, wherein the meeting information comprises interpersonal information regarding one or more participants.

6. The autonomous assistant system of claim 1, wherein the at least one party includes the operator, a participant, an observer, or combinations thereof.

7. The autonomous assistant system of claim 1, wherein the communication system comprises a communication device, the communication device being a configured to receive the one or more first emotional inputs and the one or more second emotional inputs from the at least one party using one or more sensors.

8. A non-transitory computer-readable medium for vehicle-to-user meeting preparation and storing instructions that when executed by one or more processors cause the one or more processors to:

receive one or more first emotional inputs and one or more second emotional inputs from at least one party during a first meeting, the one or more first emotional inputs being collected at a first time point and the one or more second emotional inputs being collected at a second time point, the first time point being separate from the second time point;

determine a phased emotional state using the one or more first emotional inputs and the one or more second emotional inputs, the phased emotional state being a cumulative emotional state over a time period from at least the first time point to the second time point;

collect meeting information regarding a second meeting with the at least one party using a network; and transmit, using a communication system, the meeting information and the phased emotional state to an operator for use in the second meeting.

9. The computer-readable medium of claim 8, further comprising instructions to collect, prior to the first meeting, the meeting information regarding the first meeting, the meeting information being transmitted to the operator through the communication system.

10. The computer-readable medium of claim 8, further comprising instructions to prepare guidance using the meeting information and the phased emotional state for the second meeting, and to transmit, using the communication system, the guidance and the phased emotional state to the operator for use in the second meeting.

11. The computer-readable medium of claim 10, wherein the guidance comprises one or more interaction topics with one or more participants at the second meeting.

12. The computer-readable medium of claim 8, wherein the communication system comprises a communication device, the communication device being a configured to receive the one or more first emotional inputs and the one or more second emotional inputs from the at least one party using one or more sensors.

13. A method for vehicle-to-user meeting preparation, comprising:

receiving one or more first emotional inputs and one or more second emotional inputs from at least one party during a first meeting, the one or more first emotional inputs being collected at a first time point and the one or more second emotional inputs being collected at a second time point, the first time point being separate from the second time point;

determining a phased emotional state using the one or more first emotional inputs and the one or more second emotional inputs, the phased emotional state being a cumulative emotional state over a time period from at least the first time point to the second time point;

collecting meeting information regarding a second meeting with the at least one party using a network; and transmitting, using a communication system, the meeting information and the phased emotional state to an operator for use in the second meeting.

14. The method of claim 13, further comprising collecting, prior to the first meeting, the meeting information regarding the first meeting, the meeting information being transmitted to the operator through the communication system.

15. The method of claim 13, further comprising preparing guidance using the meeting information and the phased emotional state for the second meeting, and to transmit, using the communication system, the guidance and the phased emotional state to the operator for use in the second meeting.

16. The method of claim 15, wherein the guidance comprises one or more interaction topics with one or more participants at the second meeting.

17. The method of claim 13, wherein the communication system comprises a communication device, the communication device being a configured to receive the one or more first emotional inputs and the one or more second emotional inputs from the at least one party using one or more sensors.

* * * * *